United States Patent
Nizar et al.

(10) Patent No.: US 6,889,284 B1
(45) Date of Patent: May 3, 2005

(54) METHOD AND APPARATUS FOR SUPPORTING SDRAM MEMORY

(75) Inventors: Puthiya K. Nizar, El Dorado Hills, CA (US); Khong S. Foo, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/420,887

(22) Filed: Oct. 19, 1999

(51) Int. Cl.[7] .............................................. G06F 13/36
(52) U.S. Cl. ..................................... 710/315; 711/154
(58) Field of Search ................................ 711/105, 202, 711/154; 710/305, 306, 316, 315; 709/250

(56) References Cited

U.S. PATENT DOCUMENTS

| | | | |
|---|---|---|---|
| 6,047,361 A | * | 4/2000 | Ingenio et al. ............... 711/167 |
| 6,378,056 B2 | * | 4/2002 | Nizar et al. .................. 711/170 |
| 6,449,679 B2 | * | 9/2002 | Ryan .......................... 710/315 |
| 2001/0042163 A1 | * | 11/2001 | Ryan .......................... 711/105 |

OTHER PUBLICATIONS

Computergram International; Intel Offers SDRAM Alternative to Rambus on Camino Chipset; Jul. 14, 1999.*

Carroll, Mark; Electronic Engineering Times; "Compaq, IBM, others seek memory alternatives for Tanner– and Merced–class systems—Intel preps Direct Rambus for servers (Intel will introduce Rambus/SDRAM translation ASICs . . . "; Aug. 17, 1998.*

"SDRAM to Direct RDRAM", Intel Development Forum Presentation, presentation materials (undated).*

Direct RDRAM™ 128/144–Mbit (256Kx16/18x32s), RAMBUS®, May 1999, Document DL0059, May 1999, pp. 1–62, Mountain View, California.

Rambus™ Technology Overview, DL–0040–00, Aug. 23, 1999, pp. 1–14.

* cited by examiner

*Primary Examiner*—David L. Robertson
(74) *Attorney, Agent, or Firm*—Blakely, Sokoloff, Taylor & Zafman LLP

(57) ABSTRACT

A memory translation hub comprising a memory channel interface, a memory bus interface, and a command generator coupled to the memory channel interface and to the memory bus interface. The memory channel interface receives a memory control packet from a memory channel. The memory bus interface provides a memory bus. The command generator causes the memory bus interface to provide memory control signals on the memory bus responsive to the memory control packet.

22 Claims, 2 Drawing Sheets

METHOD AND APPARATUS FOR SUPPORTING SDRAM MEMORY

BACKGROUND

1. Field of the Invention

This invention relates to data communications in a computer system, and more specifically, to a memory translator hub designed to provide a memory bus from a memory channel.

2. Background Information

Computer systems rely heavily upon Dynamic Random Access Memories ("DRAMs") to implement system memories due to their simplicity, affordability and memory density. However, it is increasingly difficult to design memory systems that satisfy the size and performance requirements for modern computer systems using DRAMs connected by conventional bus architectures. To overcome these limitations, a memory subsystem can be constructed using a memory channel architecture. Intelligent memory devices are connected by a narrow, high-speed bus, termed a channel. Packets of information are transmitted on the memory channel to communicate between the memory controller and the memory devices. Direct Rambus™ architecture using Rambus® channels is an example of a memory subsystem using a memory channel architecture.

As a new technology, the cost of components, such as Rambus DRAM (RDRAM™), for memory channel subsystems is high and supplies are uncertain. Memory channel devices require a completely different memory interface from conventional memory devices. Memory channel devices are not compatible with previous memory controllers which support more conventional memory components such as Synchronous DRAM (SDRAM) components using a memory bus.

During the transition to computer systems using memory channel subsystems, it would be desirable to build computer systems that can use either a conventional memory bus subsystem or a memory channel subsystem. Memory controllers that can support two or more conventional memory technologies on a single memory bus are known. For example, U.S. Pat. No. 5,893,136, assigned to Intel Corporation, describes a memory controller for independently supporting synchronous and asynchronous DRAM memories. It is possible to support multiple conventional memory technologies with a single memory controller because the memories use a memory bus with the same electrical signaling levels and similar signaling arrangements.

Memory channel architectures use different electrical signaling levels and a novel signaling arrangement. This precludes control of conventional SDRAM memory subsystems with memory channel controllers. Accordingly, there is a need for a memory translator that allows a memory bus subsystem to be connected to a memory channel controller.

SUMMARY

A memory translation hub comprising a memory channel interface, a memory bus interface, and a command generator coupled to the memory channel interface and to the memory bus interface. The memory channel interface receives a memory control packet from a memory channel. The memory bus interface provides a memory bus. The command generator causes the memory bus interface to provide memory control signals on the memory bus responsive to the memory control packet.

DETAILED DESCRIPTION

The present invention provides a method and apparatus to connect a memory bus, such as an SDRAM bus, to a memory channel, such as a Rambus® channel, through a translation device, which will be termed a Memory Translator Hub (MTH). The MTH interprets a protocol on the physical memory channel as defined by the invention and generates appropriate memory control signals to provide a memory bus for a conventional memory array such as an SDRAM array. The control signals on the memory channel are used for sending commands as provided by the invention from the memory channel controller, which will be termed a Memory Control Hub (MCH), to the MTH. While the data signals on the memory channel are used for data transfer between the MCH and the MTH, the protocol used between the MCH and the MTH is different from the memory channel protocol. Multiple MTHs can be connected on the memory channel and each MTH can support multiple rows of memory devices. The MTH supports interleaved and non-interleaved modes of operation for the conventional memory devices. Data is provided in 8 byte packets in non-interleaved mode and in 16 byte packets in interleaved mode. Embodiments of the invention will be described for providing a memory bus to support SDRAM memory devices from a memory channel that embodies the Direct Rambus™ architecture. It will be understood by those skilled in the art that the invention is applicable to other memory channel architectures and that the invention can provide memory buses that support other memory devices.

Figure 1:
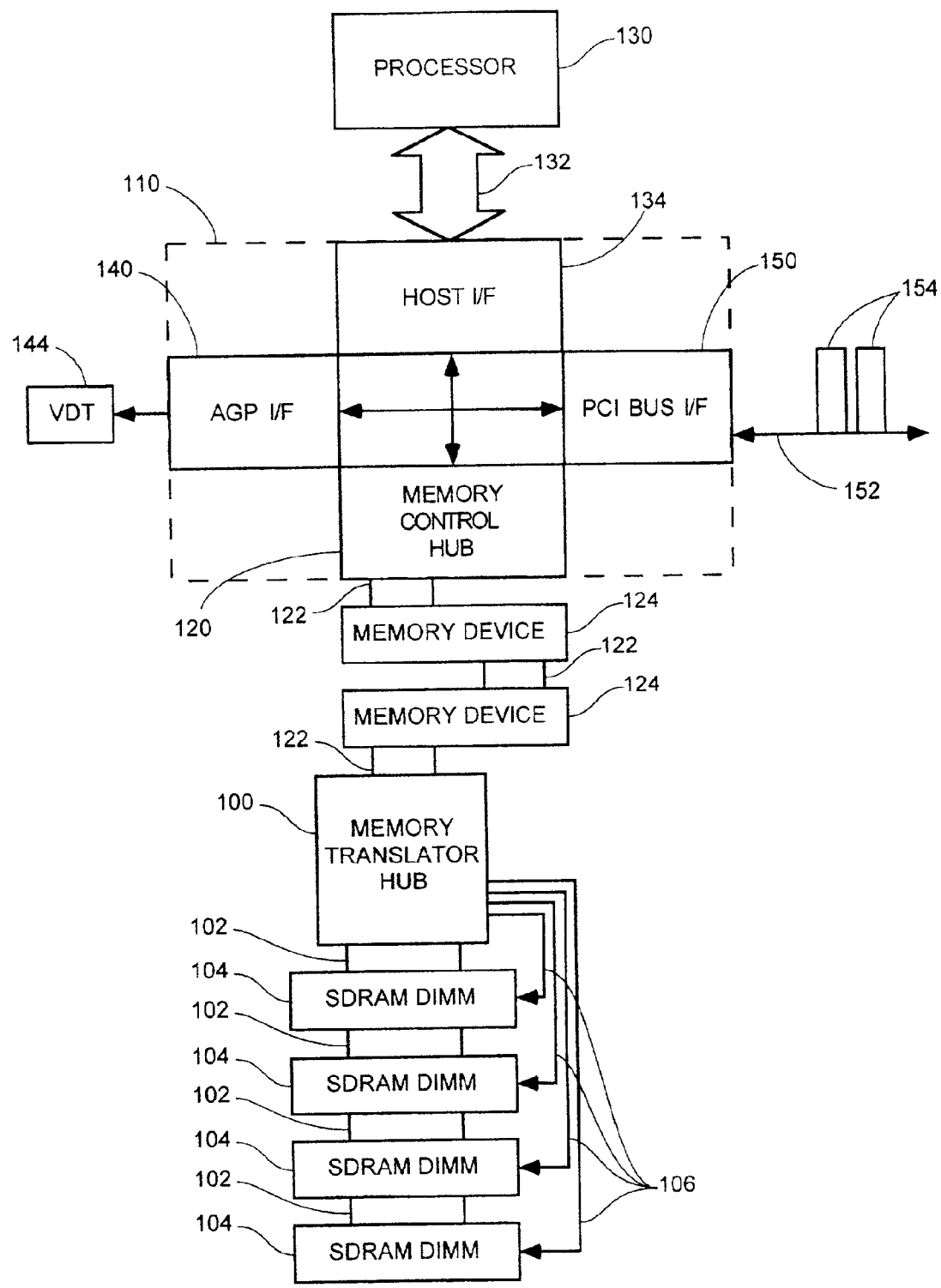
FIG. 1 is a block diagram of a computer system that includes an embodiment of a memory subsystem according to the invention.

FIG. 1 illustrates a computer system that includes an embodiment of the invention. A controller hub 110 is used to interconnect a processor 130, a video display terminal (VDT) 144, an input/output (I/O) subsystem, and a memory subsystem. The controller hub 110 includes interconnected interface sections that provide the external connections. The processor 130 is connected to the controller hub 110 by a system bus 132 which is connected through the Host Interface 134. The VDT 144 is connected through the Accelerated Graphics Port (AGP) Interface 140. The I/O subsystem provides a Peripheral Component Interconnect (PCI) bus 152 that connects I/O devices 154 through a PCI Bus Interface 150. The memory subsystem is connected through a Memory Control Hub (MCH) 120. The interconnection of the interface sections in the controller hub 110 allows the memory subsystem to handle memory requests from the processor 130, the VDT 144, and the devices 154 on the PCI bus 152.

The MCH 120 provides a memory channel 122, such as a Rambus® channel, to support the memory channel architecture, such as the Direct Rambus™ architecture. Direct Rambus™ architecture provides a memory channel architecture that includes a physical channel structure, signaling levels, and a packet protocol. Direct Rambus™ architecture is further described in "Rambus® Technology Overview," DL-0040-00, Rambus Inc., Feb. 12, 1999, which is incorporated by reference.

A number of slots are provided on the memory channel 122 to receive memory channel devices 124, such as Rambus Inline Memory Modules (RIMMs™). The memory channel 122 differs significantly from conventional memory buses such as those used to connect SDRAMs. Conventional memory buses are wider (use more pins) than the memory channel. Conventional memory buses use CMOS signaling levels while much of the signaling on the memory channel uses high-speed signals with small voltage swings, such as Rambus® Signaling Levels (RSL). The memory channel forms a continuous path through the memory devices rather than providing tapped connections onto a continuous bus.

The protocol for controlling memory channel devices is also significantly different from the protocol for SDRAM. The memory channel protocol is based on packet communication between the MCH 120 and the memory channel devices 124. The protocol to control SDRAMs on DIMMs requires separate address and data lines and includes point to point control signals from the memory controller to device rows. The SDRAM architecture is further described in "JEDEC Standard No. 21-C, Release 4," which is incorporated by reference.

Figure 2:
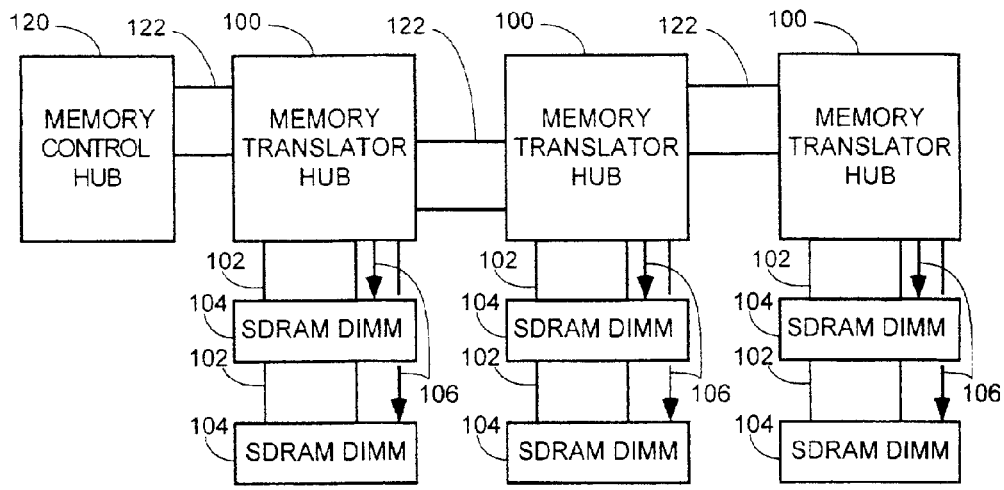
FIG. 2 is a block diagram of another embodiment of a memory subsystem according to the invention.

As shown in FIG. 1, the MTH 100 is connected to the memory channel 122 and provides an SDRAM bus 102 and SDRAM control signals 106. Both the memory channel 122 and the SDRAM bus 102 require termination (not shown). If only the memory channel is being used, the DIMM sockets are left unpopulated. If only SDRAM memory is being used, the memory device sockets are filled by continuity modules to maintain the memory channel 122. FIG. 2 illustrates another memory subsystem that uses multiple MTHs 100 that embody the invention. For clarity, memory device sockets on the memory channel are not shown in FIG. 2.

Figure 3:
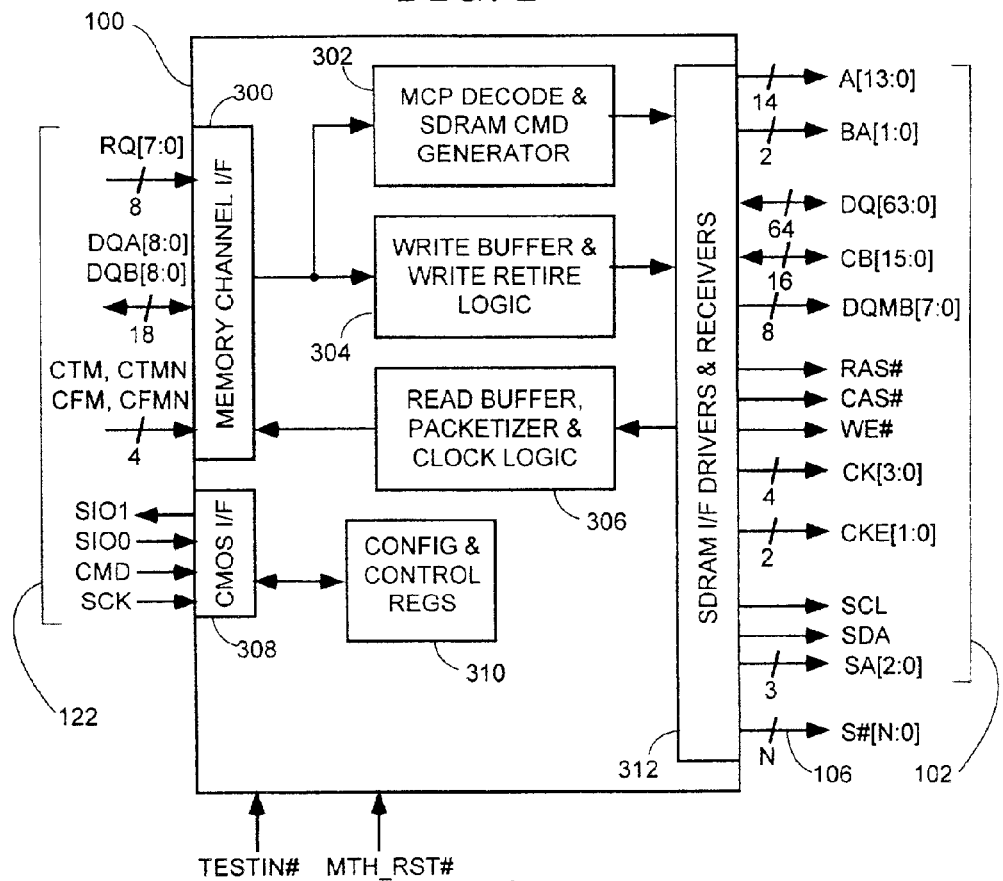
FIG. 3 is a block diagram of an embodiment of a Memory Translator Hub.

FIG. 3 shows a block diagram of an MTH 100 that embodies the invention. The MTH 100 receives Memory Control Packets (MCPs) from the MCH 120 through the memory channel 122. The MCPs utilize a protocol defined by the invention for the purpose of accessing SDRAM memory through the memory channel. The MCPs are received by the memory channel interface circuits 300 and provided to an MCP decoder and SDRAM command generator 302. The MCPs are decoded and appropriate signals are driven on the memory bus 102 and control lines 106 to carry out the command. It should be noted that the memory channel 122 will generally operate at a higher clock rate that the memory bus 102. In one embodiment, four channel cycles occur during one memory bus cycle. This may require the MCH to time the transmission of packets on the channel based on the memory bus cycle time.

For read commands, the MTH 100 waits for the data to come back from the SDRAMs 104 and then converts the data to appropriate data packets to be sent to the MCH 120 via the memory channel 122. The read data is received by the SDRAM interface receivers 312 and provided to the read buffer, packetizer, and clock logic 306 which assembles the read data as required by the memory channel interface 300. The MTH 100 is aware of the CAS Latency (CL) for the SDRAMs and times the capture of data from the SDRAMs appropriately.

For write commands, the MTH 100 contains a write buffer and write retire logic 304 that temporarily stores the write data and control from the MCH 120. The MTH 100 stores this data to the SDRAM 104 when the write buffer and write retire logic 304 detect an implied or explicit retire command from the MCH 120 by generating the required SDRAM signals.

The MTH 100 does a current calibration and temperature calibration of the memory channel 122 upon receiving the appropriate commands from the MCH 120. The MTH 100 contains registers for configuration and control. These registers are accessed through a low-speed signaling interface provided by the memory channel 122. An MTH_RST# signal can be used to cause a hardware reset of the MTH. A TESTIN# signal can be used to place the MTH into a diagnostic mode.

Memory Control Packets (MCPs) that embody the present invention are transmitted to the MTH over the portion of the memory channel used to transmit commands to memory channel devices. In an exemplary memory subsystem that uses a Rambus® channel, 8 request signals, RQ[7:0], are available on the channel to send a command from the MCH to the MTH. The MCP is sent over the memory channel in two channel clocks (RClks). To increase the speed of data communication, packet information is clocked by both the rising and falling clock edges. Therefore, the MCPs contains 4 data units. There are 32 bits (4×8) in an MCP packet. In one embodiment of invention, each MCP must be separated by at least two unused clock cycles. In another embodiment of invention, no separation by unused clocks is required and each MCP can be sent back to back.

MCPs are generally directed to a targeted memory row by a device ID field, D[3:0], in the MCP. The MTH 100 maintains an MTH ID value and an MTH ID mask to determine if the memory row targeted by the device ID field is coupled to the MTH. The device ID is masked by the MTH ID mask and then compared to the MTH ID value. If the masked device ID is equal to the MTH ID value, the MTH will respond to the MCP.

The first two bits, ST and SF, of each MCP indicate the framing of a packet and specify what kind of command packet it is. The encoding of ST and SF is as follows:

| ST | SF | Operation |
|---|---|---|
| 0 | 0 | No Framing |
| 0 | 1 | Frame an Activate Command |
| 1 | 0 | Frame a Read/Write Command |
| 1 | 1 | Frame an Extended Command |

An Activate Command packet has the following format:

| | Cycle 0 | | Cycle 1 | |
|---|---|---|---|---|
| | − | + | − | + |
| RQ7 | ST = 0 | x | R[5] | x |
| RQ6 | SF = 1 | R[12] | R[4] | x |
| RQ5 | r | R[11] | R[3] | x |
| RQ4 | D[3] | R[10] | R[2] | B[0] |
| RQ3 | D[2] | R[9] | R[1] | B[1] |
| RQ2 | D[1] | R[8] | R[0] | DBM[3] |
| RQ1 | D[0] | R[7] | r | DBM[2] |
| RQ0 | r | R[6] | r | x | x = don't care
r = reserved, logical 0

D[3:0]=Specifies the targeted SDRAM row.
R[12:0]=Specifies the SDRAM Row address
B[1:0]=Specifies the SDRAM bank address
DBM[3:2]=Specifies the device ID mask bits The two device ID mask bits, DBM[3:2], are included in the Activate Command packets to allow more than one MTH to pre-charge or activate a page in its specified SDRAM row in interleaved mode. This allows the memory controller to treat two interleaved pages as a single, larger page. The larger page enables back-to-back interleaved reads and writes for page hit, miss and empty. These bits are 0 in non-interleaved mode. These bits are used to enable masking out one of the upper two bits of the device ID (D[3], D[2]) during MTH SDRAM row decode. When the device bit mask is written to 1, the MTH comparison for the corresponding device bit is always TRUE, i.e. when DBM[3]=1, the value of D[3] always matches in all MTHs on the bus regardless of the programming of the MTH ID MASK and only bits D[2:0] are used to select the targeted memory row. Similarly, when DBM[2] 1, the value of D[2] always matches in all MTHs on the bus regardless of the programming of the MTH ID MASK and only bits D[3, 1:0] are used to select the targeted memory row. The device ID mask bits are used for pre-charge and activate commands.

An MTH that receives an Activate Command packet targeted to a memory row supported by the MTH drives the bits provided by the MCP row field R[12:0] onto the multiplexed address lines A[12:0] and the MCP bank field B[1:0] onto bank select lines BA[1:0]. The row address select, RAS#, signal is enabled and the appropriate chip select, S#[N], is enabled to transfer the row and bank selection addresses to the targeted memory device.

A Read/Write Command packet has the following format:

|     | Cycle 0 | | Cycle 1 | |
| --- | --- | --- | --- | --- |
|     | − | + | − | + |
| RQ7 | ST = 1 | x | C[5] | x |
| RQ6 | SF = 0 | x | C[4] | x |
| RQ5 | R/W | C[10] | C[3] | x |
| RQ4 | D[3] | AP | C[2] | B[0] |
| RQ3 | D[2] | C[9] | C[1] | B[1] |
| RQ2 | D[1] | C[8] | C[0] | r |
| RQ1 | D[0] | C[7] | r | r |
| RQ0 | r | C[6] | r | x | x = don't care
r = reserved, logical 0

R/W=0 for Read, 1 for Write
D[3:0]=Specifies the targeted SDRAM row.
C[10:0]=Specifies the SDRAM Column address
AP=0 for auto pre-charge disabled, 1 for auto pre-charge enabled
B[1:0]=Specifies the SDRAM bank address An MTH that receives a Read or Write Command packet targeted to a memory row supported by the MTH drives the bits provided by the MCP column field C[10:0] onto the multiplexed address lines A[11, 9:0], the auto pre-charge flag AP onto address line A[10], and the MCP bank field B[1:0] onto bank select lines BA[1:0]. The column address select, CAS#, signal is enabled and the appropriate chip select, S#[N], is enabled to transfer the column and bank selection addresses to the targeted memory device. For a Write Command, the write enable signal WE# is also enabled.

Read data is received from the memory bus 102 by the read buffer, packetizer, and clock logic 306 which packetizes the read data and causes it to be transmitted on the memory channel 122.

Write data is received from the memory channel 122 by the write buffer and write retire logic 304 which temporarily stores the write data and control from the MCH 120. In one embodiment, the write buffer can store up to two write commands from the MCH. In one embodiment, the write data packet is transmitted two memory bus cycles after the Write Command packet is transmitted. The write retire logic transmits this data to the memory devices 104 on the memory bus 102 when the write retire logic detects an implied or explicit retire command. The write retire logic places the write data on the memory bus data lines DQ[63:0], any error correction information on the check bit lines CB[15:0], and the addressing and control signal on the memory bus as described above.

Extended Command packets begin with ST=1, SF=1. If the next bit, RQ5 in the first half of cycle 0, is 1, the Extended Command is Retire with Mask. Otherwise, the Extended Command is selected by the operand bits in the MCP.

A Retire with Mask Extended Command packet has the following format:

|     | Cycle 0 | | Cycle 1 | |
| --- | --- | --- | --- | --- |
|     | − | + | − | + |
| RQ7 | ST = 1 | MA[7] | MB[7] | x |
| RQ6 | SF = 1 | MA[6] | MB[6] | x |
| RQ5 | MASK = 1 | MA[5] | MB[5] | x |
| RQ4 | D[3] | MA[4] | MB[4] | x |
| RQ3 | D[2] | MA[3] | MB[3] | x |
| RQ2 | D[1] | MA[2] | MB[2] | r |
| RQ1 | D[0] | MA[1] | MB[1] | r |
| RQ0 | 0 | MA[0] | MB[0] | x | x = don't care
r = reserved, logical 0

D[3:0]=Specifies the targeted SDRAM row.
MB[7:0]=Byte Masks for DQB bus.

Data is provided in 8 byte packets in non-interleaved mode and in 16 byte packets in interleaved mode. Retire with Mask allows a partial write of only those bytes selected by the byte masks. For a partial write in one embodiment of the invention, the Write Command packet is transmitted on the memory channel 122 in one memory bus cycle, the Retire with Mask packet is transmitted in the following memory bus cycle, and the write data packet is transmitted in the next following memory bus cycle. The MCP mask bits MA[7:0] and MB[7:0] are placed onto memory bus lines DQMB[7:0] when the correspond write data is placed on the memory bus 102.

A Pre-charge Extended Command packet has the following format:

|     | Cycle 0 | | Cycle 1 | |
| --- | --- | --- | --- | --- |
|     | − | + | − | + |
| RQ7 | ST = 1 | OP[8] = 0 | OP[5] = 0 | OP[2] = 0 |
| RQ6 | SF = 1 | OP[7] = 0 | OP[4] = 0 | OP[1] = 0 |
| RQ5 | MASK = 0 | OP[6] = 0 | OP[3] = 0 | OP[0] = 1 |
| RQ4 | D[3] | V | x | B[0] |
| RQ3 | D[2] | x | x | B[1] |
| RQ2 | D[1] | x | x | DBM[3] |
| RQ1 | D[0] | x | x | DBM[2] |
| RQ0 | BRD | x | x | x | x = don't care
r = reserved, logical 0

D[3:0]=Specifies the targeted SDRAM row.
BRD=0 for Addressed, execute to the SDRAM row specified by D[3:0]; 1 for Broadcast, all MTHs execute command to all SDRAM rows.
V=1 for pre-charge all banks.
B[1:0]=Specifies the SDRAM bank address
DBM[3:2]=Specifies the device ID mask bits as described above for Activate An MTH that receives a Pre-charge Command packet targeted to a memory row supported by the MTH drives the MCP bank field B[1:0] onto bank select lines BA[1:0]. The row address select, RAS#, and write enable WE# signals are enabled, address line A[10] is driven low and the appropriate chip select, S#[N], is enabled to pre-charge the selected bank of the targeted memory device. For a broadcast pre-charge, BRD=1, the device ID field D[3:0] and the bank field B[1:0] are ignored. The row address select, RAS#, and write enable WE# signals are enabled, address line A[10] is driven high and the all chip selects, S#[N], are enabled to pre-charge the all banks of all memory devices.

The remaining Service Extended Command packets have the following format:

|  | Cycle 0 | | Cycle 1 | |
|---|---|---|---|---|
|  | − | + | − | + |
| RQ7 | ST = 1 | OP[8] | OP[5] | OP[2] |
| RQ6 | SF = 1 | OP[7] | OP[4] | OP[1] |
| RQ5 | 0 | OP[6] | OP[3] | OP[0] |
| RQ4 | D[3] | r | x | B[0] |
| RQ3 | D[2] | x | x | B[1] |
| RQ2 | D[1] | x | x | r |
| RQ1 | D[0] | x | x | r |
| RQ0 | BRD | x | x | x | x = don't care
r = reserved, logical 0

OP[8:0]=Specifies the operations to be performed.
D[3:0]=Specifies the targeted SDRAM row.
BRD=0 for Addressed, execute to the SDRAM row specified by D[3:0]; 1 for Broadcast, all MTHs execute command to all SDRAM rows.
B[1:0]=Specifies the SDRAM bank address
The operand bits, OP[8:0], are interpreted as follows:

A No Op in two channel cycles followed by two idle cycles is used to synchronize the MTHs 100. The synchronization cycles are as follows:

|  | Cycle 0 | | Cycle 1 | | Cycle 2 | | Cycle 3 | |
|---|---|---|---|---|---|---|---|---|
|  | − | + | − | + | − | + | − | + |
| RQ7 | 1 | 0 | 0 | 0 | 0 | 0 | 0 | 0 |
| RQ6 | 1 | 0 | 0 | 0 | 0 | 0 | 0 | 0 |
| RQ5 | 0 | 0 | 0 | 0 | 0 | 0 | 0 | 0 |
| RQ4 | 0 | 0 | 0 | 0 | 0 | 0 | 0 | 0 |
| RQ3 | 0 | 0 | 0 | 0 | 0 | 0 | 0 | 0 |
| RQ2 | 0 | 0 | 0 | 0 | 0 | 0 | 0 | 0 |
| RQ1 | 0 | 0 | 0 | 0 | 0 | 0 | 0 | 0 |
| RQ0 | 1 | 0 | 0 | 0 | 0 | 0 | 0 | 0 |

The Current Calibrate and Sample command causes the MTH to initiate a current calibrate process of its channel interface. The Temperature Calibrate command causes the MTH to initiate a temperature calibration process of its channel interface.

| OP8 | OP7 | OP6 | OP5 | OP4 | OP3 | OP2 | OP1 | OP0 | Operation |
|---|---|---|---|---|---|---|---|---|---|
| 0 | 0 | 0 | 0 | 0 | 0 | 0 | 0 | 0 | No Op (No operation performed by MTH) |
| 0 | 0 | 0 | 0 | 0 | 0 | 0 | 0 | 1 | Pre-charge |
| 0 | 0 | 0 | 0 | 0 | 0 | 0 | 1 | 0 | Refresh |
| 0 | 0 | 0 | 0 | 0 | 0 | 1 | 0 | 0 | Self Refresh Entry |
| 0 | 0 | 0 | 0 | 0 | 1 | 0 | 0 | 0 | Self Refresh Exit |
| 0 | 0 | 0 | 0 | 1 | 0 | 0 | 0 | 0 | Power-down Entry |
| 0 | 0 | 0 | 1 | 0 | 0 | 0 | 0 | 0 | Power-down Exit |
| 0 | 0 | 1 | 0 | 0 | 0 | 0 | 0 | 0 | Clock Stop |
| 0 | 1 | 0 | 0 | 0 | 0 | 0 | 0 | 0 | Current Calibrate and Sample |
| 1 | 0 | 0 | 0 | 0 | 0 | 0 | 0 | 0 | Temperature Calibrate |

The following table summarizes the memory bus signals that are generated the MTH in response to the various command packets:

| Function | SCLK n | SCLK n − 1 | CKE n | CKE n − 1 | CS # | RAS # | CAS # | WE # | A11 | A10 | BA [1:0] | A9–A0 |
|---|---|---|---|---|---|---|---|---|---|---|---|---|
| NOP | R | R | H | X | L | H | H | H | X | X | X | X |
| Read | R | R | H | X | L | H | L | H | V | L | V | V |
| Read with auto-precharge | R | R | H | X | L | H | L | H | V | H | V | V |
| Write | R | R | H | X | L | H | L | L | V | L | V | V |
| Write with auto-precharge | R | R | H | X | L | H | L | L | V | H | V | V |
| Bank Activate | R | R | H | X | L | L | H | H | V | V | V | V |
| Precharge selected bank | R | R | H | X | L | L | H | L | V | L | V | X |
| Precharge all banks | R | R | H | X | L | L | H | L | X | H | X | X |
| Refresh | R | R | H | H | L | L | L | H | X | X | X | X |
| Self Refresh Entry | R | R | H | L | L | L | L | H | X | X | X | X |
| Self Refresh Exit | R | R | L | H | H | X | X | X | X | X | X | X |

-continued

| Function | SCLK n | SCLK n − 1 | CKE n | CKE n − 1 | CS # | RAS # | CAS # | WE # | A11 | A10 | BA [1:0] | A9–A0 |
|---|---|---|---|---|---|---|---|---|---|---|---|---|
| Power-down Entry | R | R | H | L | H | X | X | X | X | X | X | X |
| Power-down Exit | R | R | L | H | H | X | X | X | X | X | X | X |
| Mode Register Set | R | R | H | X | L | L | L | L | L | L | V | V |
| Clock Stop | R | L | X | X | X | X | X | X | X | X | X | X |

X = Don't care,
H = Logic high,
L = Logic Low,
R = clock running,
V = Valid address The internal logic of the MTH 100—including the 302, the write buffer and write retire logic 304, the read buffer, packetizer, and clock logic 306—may be implemented in any form of logic, as will be readily understood by those skilled in the art. The internal logic may include, but is not limited to, combinatorial logic, state machines, programmable logic, and hybrid combinations of these types of logic and others. Programmable logic includes logic that is programmed during manufacture and logic that can be programmed by various means after the MTH is in service.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A memory translation hub comprising:
   a memory bus interface that provides a memory bus having a memory bus cycle time;
   a memory channel interface that receives a memory control packet from a memory channel that times transmission of the memory control packet based on the memory bus cycle time, wherein the memory control packet includes command flag bits that indicate that the memory control packet is one of an activate command, a read/write command, and an extended command, the command flag bits being the first bits in the memory control packet; and
   a command generator coupled to the memory channel interface and to the memory bus interface, the command generator causing the memory bus interface to provide memory control signals on the memory bus responsive to the memory control packet.

2. The memory translation hub of claim 1 wherein the memory channel includes a control portion and a data portion, the memory channel interface receiving a memory control packet only from the control portion of the memory channel.

3. The memory translation hub of claim 1 wherein the memory control packet specifies a memory row, a memory row address, a memory bank address, and a device identification mask if the memory control packet is the activate command.

4. The memory translation hub of claim 1 wherein the memory control packet specifies a memory row, a memory column address, and a memory bank address, if the memory control packet is the read/write command.

5. The memory translation hub of claim 1 wherein, if the memory control packet is the extended command, the memory control packet includes extended flag bits that indicate that the memory control packet is one of a retire with mask command, a pre-charge command, and a service command.

6. The memory translation hub of claim 5 wherein the memory control packet specifies a memory row, and a byte mask, if the memory control packet is the retire with mask command.

7. The memory translation hub of claim 5 wherein the memory control packet specifies a memory row, and one of a broadcast flag and a memory bank address, if the memory control packet is the pre-charge command.

8. The memory translation hub of claim 5 wherein the memory control packet specifies a memory row, an operation, and one of a broadcast flag and a memory bank address, if the memory control packet is the service command.

9. The memory translation hub of claim 8 wherein the operation is one of a no operation, refresh, self refresh entry, self refresh exit, power-down entry, power-down exit, clock stop, current calibrate and sample, and temperature calibrate.

10. The memory translation hub of claim 2 further comprising a write logic circuit coupled to the memory channel interface and to the memory bus interface, the write logic circuit receiving a write data packet from the memory channel interface and causing the memory bus interface to provide memory control signals and data signals on the memory bus representative to the write data packet, the memory channel interface receiving a write data packet only from the data portion of the memory channel.

11. The memory translation hub of claim 2 further comprising a read logic circuit coupled to the memory channel interface and to the memory bus interface, the read logic circuit receiving read data from the memory bus interface, generating a read data packet containing the read data, and causing the memory channel interface to transmit the read data packet on the data portion of the memory channel.

12. A memory translation hub comprising:
   means for receiving a memory control packet from a memory channel with a timing based on a cycle timing of a memory bus, wherein the memory control packet includes command flag bits that indicate that the memory control packet is one of an activate command, a read/write command, and an extended command, the command flag bits being the first bits in the memory control packet;
   means for translating the memory control packet to memory control signals; and
   means for generating the memory control signals on the memory bus.

13. The memory translation hub of claim 12 wherein the means for receiving a memory control packet further comprises means for receiving a memory control packet from a control portion of the memory channel responsive to the memory control packet.

14. The memory translation hub of claim 13 further comprising:
   means for receiving a write data packet from a data portion of the memory channel;
   means for providing memory control signals and data signals on the memory bus responsive to the write data packet.

15. The memory translation hub of claim 13 further comprising:
   means for receiving read data from the memory bus;
   means for generating a read data packet containing the read data; and
   means for transmitting the read data packet on a data portion of the memory channel.

16. A method of connecting a memory bus to a memory controller hub through a memory channel comprising:
   receiving a memory control packet from the memory channel, timing of receiving the memory control packet being based on a cycle timing of the memory bus, wherein the memory control packet includes command flag bits that indicate that the memory control packet is one of an activate command, a read/write command, and an extended command, the command flag bits being the first bits in the memory control packet;
   translating the memory control packet to memory control signals; and
   generating the memory control signals on the memory bus.

17. The method of claim 16 further comprising:
   receiving a write data packet from the memory channel; and
   providing memory control signals and data signals on the memory bus responsive to the write data packet.

18. The method of claim 16 further comprising:
   receiving read data from the memory bus interface;
   generating a read data packet containing the read data; and
   transmitting the read data packet on the memory channel.

19. A memory subsystem comprising:
   a memory bus having a memory bus cycle time;
   a memory device coupled to the memory bus;
   a memory channel;
   a memory control hub coupled to the memory channel, the memory control hub transmitting memory control packets based on the memory bus cycle time, wherein memory control packets include command flag bits that indicate that each of the memory control packets is one of an active command, a read/write command, and an extended command, the command flag bits being the first bits in each of the memory control packets; and
   a memory translation hub coupled to the memory channel and to the memory bus, the memory translation hub to receive a memory control packet from the memory channel, and to generate memory control signals on the memory bus responsive to the memory control packet.

20. The memory subsystem of claim 19 wherein the memory channel includes a control portion and a data portion, the memory translation hub receiving a memory control packet only from the control portion of the memory channel.

21. The memory subsystem of claim 20 wherein the memory translation hub further receives a write data packet from the data portion of the memory channel, and generates memory control signals and data signals on the memory bus responsive to the write data packet.

22. The memory translation hub of claim 20 wherein the memory translation hub further receives read data from the memory bus interface, generates a read data packet containing the read data, and transmits the read data packet on the data portion of the memory channel.

* * * * *

UNITED STATES PATENT AND TRADEMARK OFFICE
CERTIFICATE OF CORRECTION

PATENT NO. : 6,889,284 B1
DATED : May 3, 2005
INVENTOR(S) : Nizar et al.

It is certified that error appears in the above-identified patent and that said Letters Patent is hereby corrected as shown below:

Column 4,
Line 67, delete "1" and insert -- =1 --.

Column 6,
Line 18, after "row.", insert -- MA[7.0]=Byte Masks for DQA bus. --.

Column 8,
Line 42, after "generated", insert -- by --.

Column 10,
Line 43, delete "representative" and insert -- responsive --.

Signed and Sealed this

Sixteenth Day of August, 2005

JON W. DUDAS
*Director of the United States Patent and Trademark Office*